United States Patent [19]

Matthes et al.

[11] Patent Number: 4,612,611
[45] Date of Patent: Sep. 16, 1986

[54] STARTING CIRCUIT FOR A PARALLEL RESONANT CIRCUIT INVERTER

[75] Inventors: Hans G. Matthes, Wermelskirchen; Hasso Wittenbecher, Remscheid, both of Fed. Rep. of Germany

[73] Assignee: A.E.G. Elotherm GmbH, Remscheid, Fed. Rep. of Germany

[21] Appl. No.: 645,763

[22] Filed: Aug. 30, 1984

[30] Foreign Application Priority Data

Sep. 2, 1983 [DE] Fed. Rep. of Germany ....... 3331690

[51] Int. Cl.[4] ............................................ H02M 7/517
[52] U.S. Cl. ........................................ 363/49; 363/36; 363/136
[58] Field of Search .................... 363/27, 28, 49, 136, 363/36; 219/10.77

[56] References Cited

U.S. PATENT DOCUMENTS

| 3,657,634 | 4/1972 | Eastop | 363/49 |
| 3,757,197 | 9/1973 | Bailey | 363/49 |
| 4,086,621 | 4/1978 | Vukasovic | 363/49 |
| 4,086,622 | 4/1978 | Vukasovic | 363/49 |

FOREIGN PATENT DOCUMENTS

| 54-125439 | 9/1979 | Japan | 363/49 |
| 58-079479 | 5/1983 | Japan | 363/49 |
| 473270 | 9/1975 | U.S.S.R. | 363/49 |

Primary Examiner—Patrick R. Salce
Assistant Examiner—Jeffrey Sterrett
Attorney, Agent, or Firm—Cushman, Darby & Cushman

[57] ABSTRACT

The invention relates to a parallel resonant-circuit converter having at least one intermediate-circuit inductance. In order to guarantee that the inverter will start even with different loads, the voltage produced when discharging a separately charged capacitor across the load is monitored. At some time after the maximum voltage across the load is reached, another separately charged capacitor is discharged via a thyristor of the inverter located in the biasing circuit of the intermediate-circuit inductance. Because of the blocked thyristor and of the capacitor charged to the voltage maximum, the biasing current is forced to flow via diagonal branches and including the load. In this manner, reliable starting of the inverter is possible even with loads having a different natural frequency.

7 Claims, 2 Drawing Figures

STARTING CIRCUIT FOR A PARALLEL RESONANT CIRCUIT INVERTER

BACKGROUND OF THE INVENTION

1. Field of the Invention

The invention relates to a parallel resonant circuit converter having at least one intermediate-circuit inductance which can be biased via two series-connected thryistors of the inverter, and a load which forms the parallel resonant circuit and to which a starting circuit is connected for commutating the current flowing during the biasing to the thyristors which, by including the load, are connected in series in diagonal branches.

2. Discussion of the Prior Art

In a known parallel resonant circuit converter, the starting circuit consists of an auxiliary oscillator which excites the resonant load circuit until the load capacitor has a voltage which is suitable for commutating the preselected starting direct current. Starting by means of such a starting device can take relatively long and is therefore not always suitable for small operating periods.

It is also known to connect a series resonant circuit to the parallel resonant circuit of the load. In order to obtain a successful start with such a starting circuit, it is necessary to transfer an optimum amount of energy from the series resonant circuit to the resonant load circuit. This can be achieved only if the natural frequency and damping have been appropriately selected. Since the natural frequency of the resonant load circuit, however, fluctuates with the load, starting cannot be guaranteed in every case if one and the same starting circuit is used.

SUMMARY OF THE INVENTION

The invention has the basic aim of creating a parallel resonant circuit converter which can be rapidly started even with changing load and thus changing natural frequency and damping.

According to the invention, this aim is achieved by the fact that the starting circuit comprises a separately charged capacitor which can be discharged via a switch to the parallel resonant circuit of the load, that a further separately charged capacitor can be discharged by means of a further switch via one of the thyristors located in the biasing circuit of the intermediate-circuit inductance with a current direction which is opposite to the direction of the current flowing during the biasing, and that a control device initiates the discharging of the further capacitor by a further switch. This discharging is accomplished as a function of the voltage produced across the load at a time between, at earliest when this voltage reaches a maximum, and at the latest by the time when the first capacitor discharges.

In the parallel resonant circuit converter according to the invention, commutation takes place individually as a function of the characteristics of the resonant load circuit by monitoring the voltage, produced across the parallel resonant circuit of the load during discharging and dependent on the natural frequency of the load circuit, for a maximum and initiating, as a function of this voltage, commutation of the current to the diagonal thyristors by forcing one thyristor to turn off.

According to a development of the invention, the voltage across the load can be sensed by a differentiating element to ensure reliable detection of the voltage maximum. In contrast to the voltage maximum, the zero transition is more clearly defined.

It has been found to be advantageous to close the further switch not at the voltage maximum but with some delay. Although this results in the commutating voltage being a little lower than possible at the beginning, because of the associated reduction in frequency a higher load resistance is produced for commutation which, in turn, results in a higher and thus more favourable voltage for commutation.

BRIEF DESCRIPTION OF THE DRAWINGS

In the text which follows, the invention is explained in greater detail with the aid of a drawing, in which.

DESCRIPTION OF THE SPECIFIC EMBODIMENT

Figure 1:
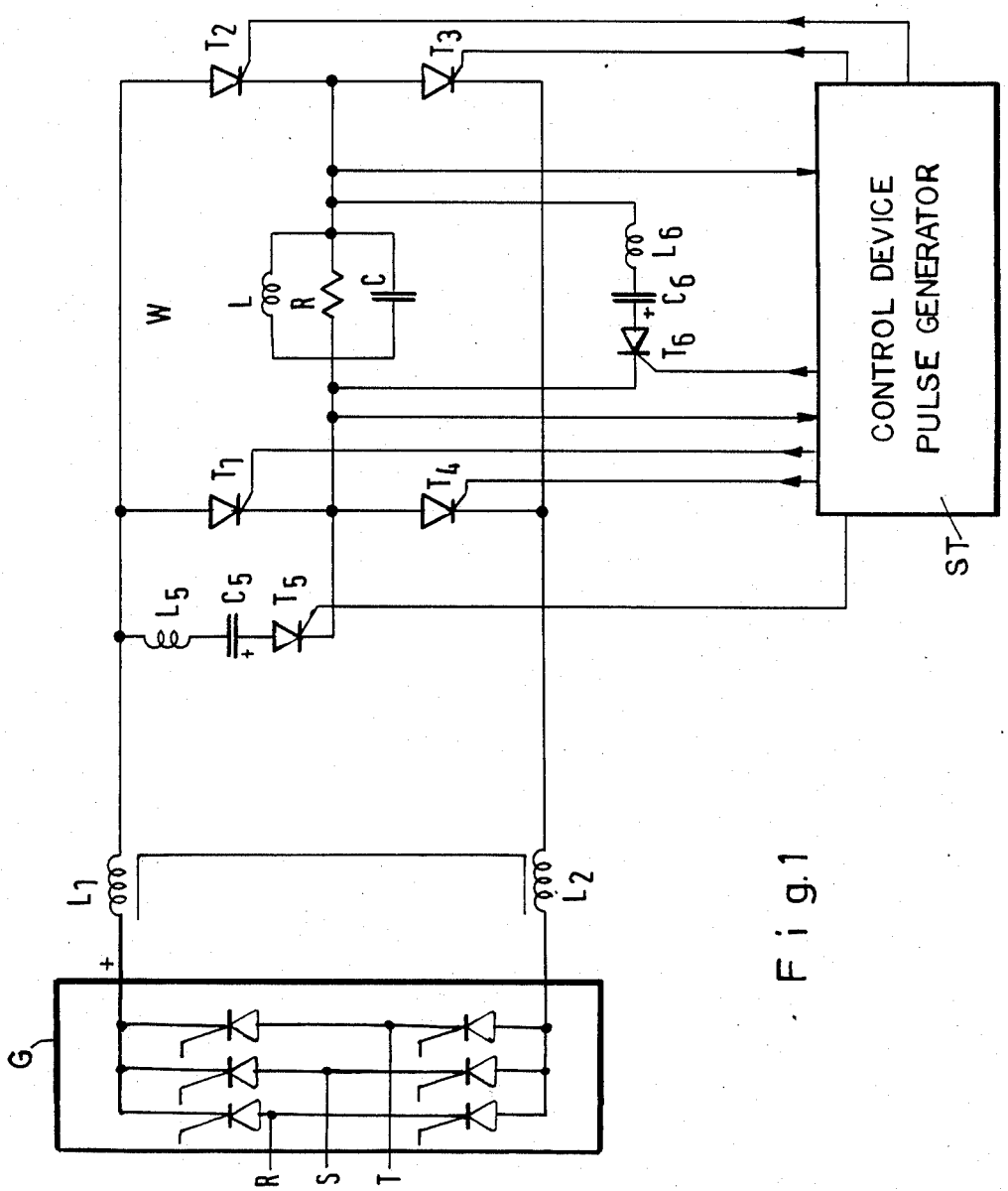
FIG. 1 shows a circuit diagram.
Figure 2:
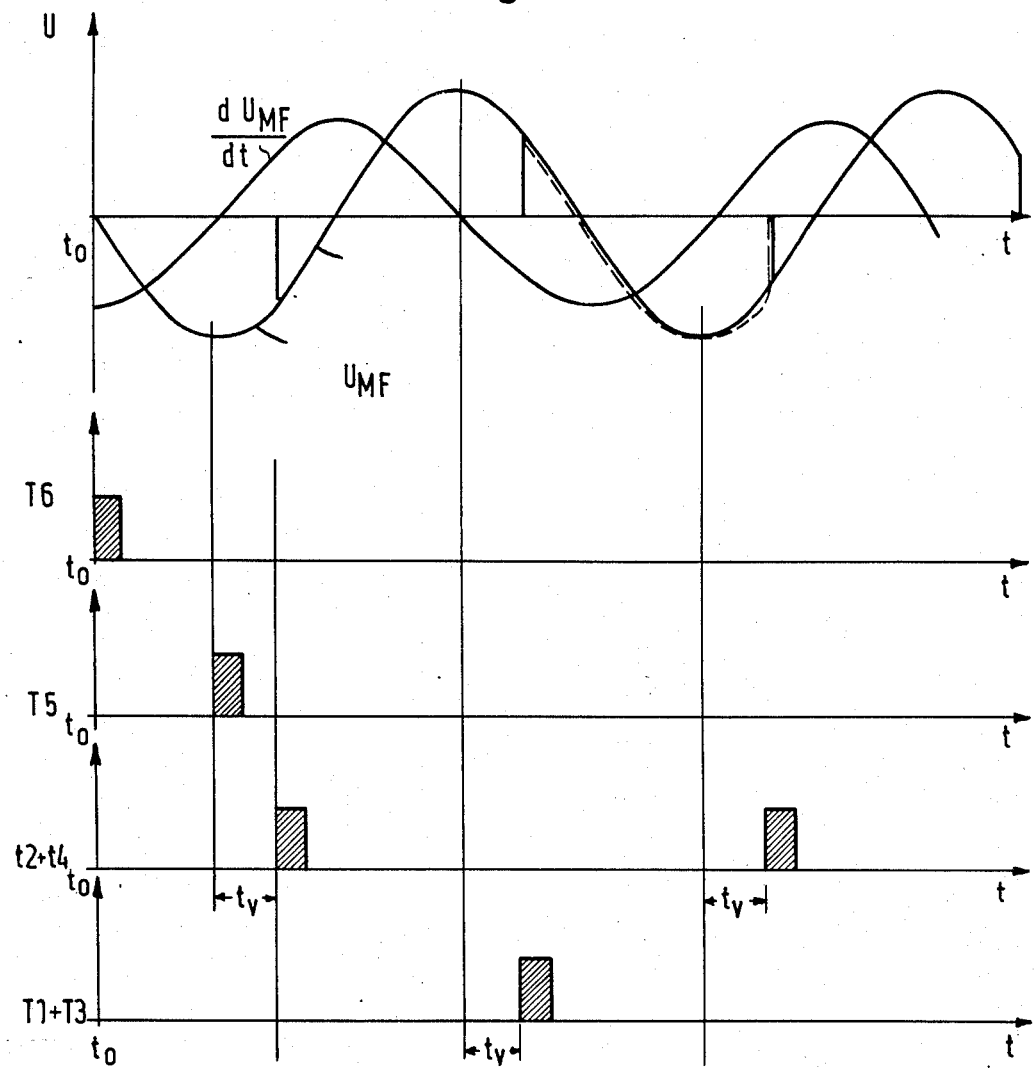
FIG. 2 shows a diagram of the various voltages and control pulses.
Figure 3:
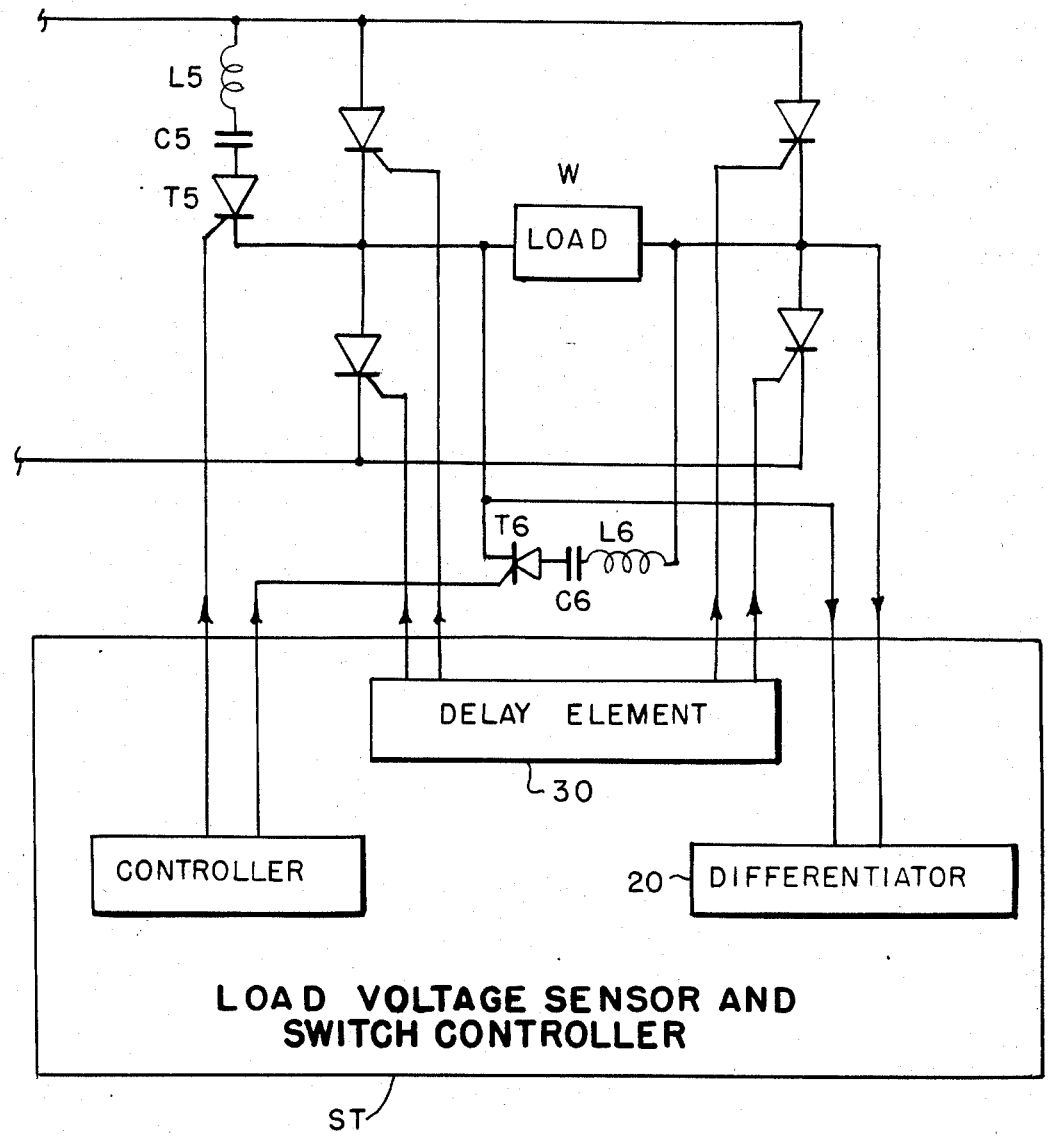

The parallel resonant circuit converter shown in FIG. 1 consists of a bridge rectifier G which is connected to the mains, two intermediate-circuit inductances $L_1$, $L_2$ and a bridge inverter W. The load is located as a parallel resonant circuit consisting of inductance L, capacitor C and resistor R in the bridge branch of the inverter W. Each diagonal branch has a thrysitor $T_1$ to $T_4$. The thyristors $T_1$ to $T_4$ are provided with pulses, corresponding to the required inverter frequency, from a pulse generator contained in a control device.

A capacitor $C_5$ in series with a choke $L_5$ and a thyristor $T_5$ are connected in parallel with the thyristor $T_1$. A capacitor $C_6$ and an inductance $L_6$ and a thyristor $T_6$ are connected in parallel with the load LRC. The capacitors $C_5$, $C_6$ are separately loaded by a current source, not shown.

The control device St monitors the voltage across the load circuit LRC and supplies a starting signal to the thyristor $T_5$.

The parallel resonant circuit converter according to the invention operates in the following manner:

Before the inverter W is started, the thyristors $T_1$, $T_4$ are on and carry the current required for the biasing of the inductance $L_1$, $L_2$. The capacitors $C_5$, $C_6$ are charged by the above-referenced current source with the polarity as shown in the circuit diagram. At time $t=0$, a firing pulse is supplied to the thyristor $T_6$ which initiates the discharging of the capacitor $C_6$ via the load circuit LRC. The voltage $U_{MF}$ shown in the diagram is then produced across the load circuit. This voltage is sensed by the control device St and differentiator 20 so that the voltage maximum may be more easily located. The zero transition of the differentiated voltage $U_{MF}$ determines the control pulse for the thyristor $T_5$. The capacitor $C_5$ is then discharged via the diagonal branch containing thyristor $T_1$ in a direction of current flow which is opposite to the direction of flow of biasing current in $T_1$. This turns off the thyristor $T_1$. The thyristor $T_5$ then carries the biasing current for a specific time $t_v$. After time $t_v$ has elapsed, firing of the thyristors $T_2$ and $T_4$ is initiated. Delay elements 30, may be used to delay signals to the thyristors $T_4$, $T_1$, $T_3$, and $T_2$. The resonant-circuit capacitor C, charged by the discharging of the capacitor $C_6$, forms a sink for the biasing current on the side facing the thyristor $T_2$ so that the biasing current flows via $T_2$, the load LRC and the thyristor $T_4$. With a sufficiently high biasing current, the latter is capable of charging the resonant-circuit capacitor C in such a manner that it charges up to a voltage which is adequate for allowing the inverter W now to commutate by itself.

If the inverter W is operated with a different load, in principle this will not change anything in this operation. The only difference is that a different voltage $U_{MF}$ will be produced across the load. However, since the firing pulse for the thyristor $T_5$, which initiates the commutation process, is given as a function of the maximum of the voltage across the load, a reliable start for the inverter is guaranteed even in this case.

What is claimed is:

1. An inverter for driving a load which is a parallel resonant circuit comprising:

at least one inductance device;

at least two series-connected thyristors which bias said inductance device by forming a current path across said inductance device when said thyristors are conducting;

starting circuit means for applying a starting signal to the load, including, (a) a first separately charged capacitor, (b) first switch means for discharging said first capacitor to the load, (c) a second separately charged capacitor, and (d) second switch means for discharging said second capacitor to one of said at least two series-connected thyristors located in the biasing circuit of said inductance device with a current direction which is opposite to the direction of the current flowing during the biasing of said inductance device so that said one of the thyristors is reverse biased and removed from conduction; and control means for initiating the discharging of the second capacitor by means of said second switch means as a function of a rate of change of a voltage produced across the load when said first capacitor discharges.

2. A parallel resonant circuit inverter according to claim 1, wherein the voltage across the load is sensed via a differentiating element.

3. A parallel resonant circuit converter according to claim 1 further comprising a delay element in the path between said control means and said thyristors.

4. A circuit for starting the operation of an inverter including at least one inductor device, and at least two thyristor means for selectively directing current through a parallel resonant load, at least one of the thyristor means being initially conducting to produce a current path, said circuit comprising:

charge storing circuit means, coupled in parallel to the load, for storing a first charge, and discharging said first charge across the load in a first direction in response to a start signal;

said charge storing means including at least: (1) means for storing a first charge, and (2) first switch means for selectively coupling said first stored charge to the load in response to said start signal, thereby producing a current flow through the load in said first direction;

differentiator means for detecting a rate of change of voltage on the load and producing an output signal indicative thereof;

shut-off circuit means for storing a second charge and discharging said second charge in a manner to reverse bias at least one of said thyristor means which is initially conducting in response to a shut-off signal, to thereby remove said at least one thyristor means from a conducting state;

said shut-off circuit means including at least: (1) means for storing a second charge, and (2) second switch means for selectively coupling said second stored charge to said at least one thyristor means in response to said shut-off signal, to thereby reverse bias said at least one thyristor means; and controller means for: (1) producing said start signal in response to an external stimulus, (2) producing said shut-off signal when said output signal from said differentiator means is within a predetermined range of values and (3) then, producing a gating signal to at least one other thyristor means than said at least one thyristor means that is initially conducting, to produce a current flow through the load in a second direction, thereby causing the load to begin a resonant oscillation.

5. A circuit as in claim 4 wherein said shut-off signal is produced during a time period which begins when said output signal from said differentiator means is at a maximum value.

6. A circuit as in claim 5 wherein said switch means in both of said charge storing circuit means and said shut-off means are thyristors.

7. An inverter circuit for driving a parallel resonant load comprising at least one inductor means for storing charge;

first thyristor means, electrically coupled in series to said at least one inductor means, for selectively allowing a current flow therethrough, said first thyristor means being in a conducting state before the initiation of the operation of said inverter thereby causing a biasing current flow through said inductor means;

starting circuit means, including a first capacitor and a first switch, for storing a first charge in said first capacitor and discharging said first stored charge across the load in a first direction when said first switch is actuated by a start signal;

differentiator means for detecting a rate of change of voltage on the load after said first switch of said starting circuit means is actuated and producing an output signal indicative thereof;

shut-off circuit means, including a second capacitor and second switch, for storing a second charge in said second capacitor and discharging said second charge in a manner to reverse bias said first thyristor means when said second switch is actuated in response to a shut-off signal;

second thyristor means for causing a current flow in the load in a second direction when conducting; and controller means for: (1) producing said start signal; (2) producing said shut-off signal when said output signal from said differentiator means is within a predetermined range of values, (3) producing a gating signal to said second thyristor means to produce a current flow through the load in said second direction which is opposite to the direction of said first direction, thereby causing the load to oscillate, and (4) thereafter selectively producing gating signals alternately to said first thyristor means and said second thyristor means to thereby cause a bipolar signal to be produced across said load.

* * * * *